United States Patent
Jung et al.

(10) Patent No.: US 9,164,660 B2
(45) Date of Patent: Oct. 20, 2015

(54) METHOD OF CONTROLLING MOBILE TERMINAL

(71) Applicant: LG Electronics Inc., Seoul (KR)

(72) Inventors: Mijin Jung, Seoul (KR); Moonhyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 13/734,391

(22) Filed: Jan. 4, 2013

(65) Prior Publication Data

US 2013/0179819 A1 Jul. 11, 2013

Related U.S. Application Data

(60) Provisional application No. 61/583,626, filed on Jan. 6, 2012.

(51) Int. Cl.
  *G06F 3/14* (2006.01)
  *G06F 3/0482* (2013.01)
  *H04L 12/28* (2006.01)

(52) U.S. Cl.
  CPC .......... *G06F 3/0482* (2013.01); *H04L 12/2825* (2013.01); *H04L 12/2827* (2013.01)

(58) Field of Classification Search
  CPC ..................................... G06F 3/14; G06F 3/17

USPC ............ 715/200–277, 700–867; 345/30–111; 702/60; 714/733; 348/177, 584

See application file for complete search history.

(56) References Cited

U.S. PATENT DOCUMENTS

| | | | |
|---|---|---|---|
| 5,778,006 A * | 7/1998 | Mukai et al. | 714/733 |
| 6,313,873 B1 * | 11/2001 | Lee | 348/177 |
| 6,751,561 B2 * | 6/2004 | Oh | 702/60 |
| 2005/0052578 A1 * | 3/2005 | Phillips et al. | 348/584 |

* cited by examiner

*Primary Examiner* — Ruay Ho
(74) *Attorney, Agent, or Firm* — Dentons US LLP

(57) ABSTRACT

A method of controlling a mobile terminal, for diagnosing a home appliance using the mobile terminal is disclosed. The method includes a menu display step of displaying a diagnosis menu for diagnosis of a home appliance on a display, an information receiving step of receiving information about a current state of the home appliance or presence of a problem as an audio signal when the diagnosis menu is selected, the information being diagnosed by the home appliance, a result display step of displaying a diagnosis result of the home appliance on the display, the diagnosis result being obtained based on the information received in the information receiving step, and a solution display step of displaying a solution based on the diagnosis result to suggest a measure to be taken by a user to the user.

20 Claims, 13 Drawing Sheets

METHOD OF CONTROLLING MOBILE TERMINAL

This application claims the benefit of U.S. Patent Application No. 61/583,626 filed on Jan. 6, 2012, which is hereby incorporated by reference as if fully set forth herein.

BACKGROUND OF THE INVENTION

1. Field of the Invention

The present invention relates to a method of controlling a mobile terminal, and more particularly to a method of controlling a mobile terminal, for diagnosing a home appliance using the mobile terminal.

2. Discussion of the Related Art

In general, products such as washing machines, dryers, refrigerators, and ovens are closely connected to user convenience. It is very important in modern life to normally use such home appliances. This is because a user may experience some inconvenience when the user cannot use home appliances in case of necessity.

When a home appliance malfunctions, it is impossible to normally use the home appliance. Here, it is not important whether the malfunction of the home appliance is caused by product problems or user error. In general, users are aware of the use of the home appliance only and are not aware of a method of overcoming problems when the home appliance malfunctions.

In many cases, when a home appliance malfunctions, a user contacts a service center and explains the malfunction. Then, the service center determines whether the home appliance needs not to be repaired due to user error or the home appliance needs to be repaired, based on the explained issue.

It is too cumbersome to contact the service center whenever the home appliance malfunctions. In addition, it is not easy to identify the malfunction of the home appliance and to determine appropriate measures to resolve the issue, based on the user's explanation.

For example, even if the service center determines that the malfunction is caused simply by component error and sends a repair technician to a place where the home appliance is installed in order to replace the component, the repair technician can determine that basic repair needs to be performed on the home appliance after arriving at the place. In this case, it can take a long time to repair the home appliance, which means that a period of time when the user cannot use the home appliance is increased.

In addition, even if the service center determines that the malfunction is caused by product problems and sends the repair technician to the place, the repair technician can determine that the malfunction is caused simply by user error, but not by the product problems. In many cases, the malfunction is determined to be caused simply by the user error, for example, a power plug is not put into a socket or a faucet for water supply is turned off in the case of a washing machine. As in the above case, a period of time when the user cannot use the home appliance is also increased. In addition, needless time and effort can be wasted.

Accordingly, there is a need to correctly determine the cause of malfunction of a home appliance and to take appropriate measures based on the determined cause.

That is, there is a need to minimize the number of user reports on malfunction of home appliances to a service center and to minimize the number of unnecessary customer services at the service center.

SUMMARY OF THE INVENTION

Accordingly, the present invention is directed to a method of controlling a mobile terminal that substantially obviates one or more problems due to limitations and disadvantages of the related art.

An object of the present invention is to provide a method of controlling a mobile terminal, for easily diagnosing a home appliance through the mobile terminal. In addition, the present invention provides a mobile terminal for diagnosis of the home appliance.

Another object of the present invention is to provide a mobile terminal and a method of controlling the same, which may easily diagnose the home appliance even if a communication module is not installed in the home appliance.

Another object of the present invention is to provide a mobile terminal and a method of controlling the same, which may diagnose a home appliance using an audio signal and may provide a diagnostic method ensuring reliability and accuracy of the audio signal.

A further object of the present invention is to provide a mobile terminal and a method of controlling the same, which may provide different solutions when a user can or cannot take a measure a problem of a home appliance to provide a convenient diagnosis method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mobile terminal includes a menu display step of displaying a diagnosis menu for diagnosis of a home appliance on a display, an information receiving step of receiving information about a current state of the home appliance or presence of a problem as an audio signal when the diagnosis menu is selected, the information being diagnosed by the home appliance, a result display step of displaying a diagnosis result of the home appliance on the display, the diagnosis result being obtained based on the information received in the information receiving step, and a solution display step of displaying a solution based on the diagnosis result to suggest a measure to be taken by a user to the user.

The information receiving step may include an execution menu display step of displaying an execution menu for performance of the information receiving step. When the execution menu is input, the mobile terminal may receive and store the audio signal.

The information receiving step may include a step of displaying progresses and progress states of the information receiving step when the execution menu is selected. Thus, the user may easily recognize a degree by which the information receiving step proceeds.

The information receiving step may include a guide display step of informing the user of whether an intensity of the audio signal is within an appropriate band to a user, thereby ensuring accuracy and reliability of the received audio signal.

The guide display step may include displaying a guide line as a reference of the appropriate band and visibly displaying an amplitude of the audio signal on the guide line.

The guide line may include a reference line and bandwidth lines respectively displayed above and below the reference line and indicating a minimum allowable amplitude.

The user may reduce trial and error by using the guide display step and the guide line. That is, the mobile terminal may receive and store the audio signal having an appropriate band via minimized trials.

The result display step may be performed when the information receive step is successfully performed, and a retry menu for retrying the information receiving step may be displayed when the result display step fails.

The information received in the information receiving step may be compared with reference information in a database (DB) of the mobile terminal or an external DB to extract the diagnosis result, and the diagnosis result may be displayed in the result display step.

The result display step and the solution display step may be performed on different display regions of the same display. Thus, the user can check error information and solutions for the error information via a single display, thereby improving user convenience.

The solution display step may include displaying a contact number of a service center regardless of the diagnosis result.

The solution display step may include separately displaying a problem to be addressed by the user and a problem not to be addressed by the user when the home appliance has problems as the diagnosis result.

The method may further include displaying a menu for selecting a problem from among a plurality of problems of the home appliance as the diagnosis result, and displaying a solution corresponding to a menu corresponding to the selected problem when the menu is selected.

The method may further include simultaneously displaying a measure to be taken by the user and a contact number of a service center when the problem is to be addressed by the user, and displaying the contact number of the service center when the problem is not to be addressed by the user.

The menu display step may further include a mode selection step of selecting a mode in which the information is received.

The information receiving mode may include a wireless diagnosis mode in which the information is received as a digital signal from the home appliance through a wireless fidelity (Wi-Fi) communication module, and an audio diagnosis mode in which the information is received as an audio signal through a microphone.

The information receiving step may include receiving information about a current state of the home appliance or presence of a problem, as a digital signal, when the wireless diagnosis mode is selected, the information being diagnosed by the home appliance.

In another aspect of the present invention, a method of controlling a mobile terminal includes a mode display step of displaying a diagnosis mode on a display so as to allow a user to select whether information about a current state of the home appliance or presence of a problem is received as an audio signal or a digital signal, the information being diagnosed by the home appliance, an information receiving step of receiving the information as the audio signal or the digital signal according to a diagnosis mode when the diagnosis mode is selected, a result display step of displaying a diagnosis result of the home appliance based on the information received in the information receiving step, on the display, and a solution display step of displaying a solution based on the diagnosis result to suggest a measure to be taken by a user to the user.

The diagnosis mode may include a wireless diagnosis mode in which the information is received as a digital signal from the home appliance through a wireless communication module, and an audio diagnosis mode in which the information is received as an audio signal through a microphone.

The method may further include the mobile terminal commanding the home appliance to transmit the digital signal to the mobile terminal when the wireless diagnosis mode is selected.

In accordance with the present invention, the above and other objects can be accomplished by the provision of a recording medium for storing the control method of the mobile terminal. The control method may be provided in the form of application installable in the mobile terminal. Thus, the user may down and install the application via various application markets.

The features of the above-embodiments are embodied in combinations otherwise being mutually exclusive. Thus, advantages extracted from the features may be obtained in combinations.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Throughout the exemplary embodiments of the present invention, examples of a home appliance to be diagnosed may include a washing machine, a dryer, a refrigerator, an oven, a water purifier, an air conditioner, and a cleaner. Of course, the home appliance is not limited thereto and the present invention can be applied to various other home appliances.

Figure 1:
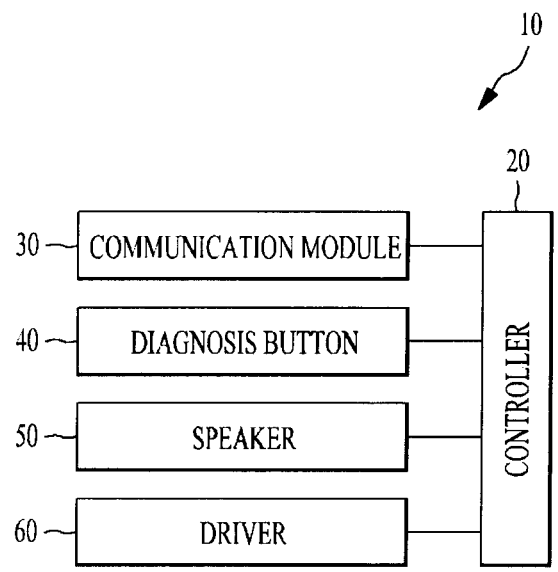
FIG. 1 is a schematic block diagram of a home appliance that is applicable to an embodiment of the present invention.

FIG. 1 is a schematic block diagram of a home appliance 10 to be diagnosed, according to an embodiment of the present invention.

The home appliance 10 may include a controller 20 for controlling driving of the home appliance 10, an interface unit 40 for a user interface, and a driver 60 for a unique operation of the home appliance 10.

In the case of the washing machine, the driver 60 may include a motor for driving a drum, a feed valve for water supply, various sensors, and the like. In the case of the refrigerator, the driver 60 may include a compressor for compressing a refrigerant, a fan for fanning cool air, a feed value of an icemaker, various sensors, and the like.

Accordingly, the controller 20 controls an operation of the driver 60 according to information input by a user through the interface unit 40 so as to perform the unique operation of the home appliance 10.

If necessary, the home appliance 10 may include a communication module 30. The communication module 30 may be used for communication with external objects. The communication module 30 is a wired or wireless communication module but preferably is a wireless communication module in order to improve user convenience and accessibility.

Examples of the wireless communication module may include various communication modules such as a wireless fidelity (Wi-Fi) communication module, a ZIPBee communication module, and a Bluetooth communication module. However, preferably, the wireless communication module is the Wi-Fi communication module in consideration of an environment for communication with external devices, a communication environment at home, and an environment for communication with a mobile device.

Basically, in order to diagnose the home appliance 10, the home appliance 10 needs to generate information (hereinafter, referred to as "diagnosis information") about a current state or the presence of a problem. In other words, the home appliance 10 needs to generate the diagnosis information. In addition, the diagnosis information may include a plurality of error information as well as error information about one error. Of course, in order to generate the diagnosis information, a command or input for the generation of the diagnosis information needs to be applied to the home appliance 10.

The command for the generation of the diagnosis information may be applied through the communication module 30. In other words, the home appliance 10 may be commanded to generate the diagnosis information through a mobile device 100 that will be described below.

Alternatively, the home appliance 10 may be commanded to generate the diagnosis information through the interface unit 40 of the home appliance 10. That is, the user may input the command for the generation of the diagnosis information to the home appliance 10 through the interface unit 40. For example, the interface unit 40 may include a diagnosis button (hereinafter, referred to as the interface unit 40 or the diagnosis button 40). In this case, the user may push the diagnosis button 40 to command the home appliance 10 to generate the diagnosis information.

When the home appliance 10 is commanded to generate the diagnosis information through the communication module 30 or the interface unit 40, the home appliance 10 may perform a diagnosis algorithm to generate the diagnosis information. The controller 20 performs the diagnosis algorithm to determine whether the current state of the home appliance 10 is abnormal or not. In this case, when an error exists, the controller 20 identifies the error. Of course, a plurality of errors may exist.

In the case of the washing machine, the diagnosis information may include various information regarding a problem of the feed valve, a problem of the motor that drives the drum, a problem of a drain pump, and the like.

The home appliance 10 may provide various methods of transmitting the diagnosis information to an external device. For example, the diagnosis information may be transmitted to the external device, for example, a mobile device through the communication module 30. In this case, the diagnosis information may be transmitted to the external device in the form of a digital signal or digital code.

Alternatively, the home appliance 10 may transmit the diagnosis information to the external device, for example, the mobile device in the form of an audio signal. That is, the diagnosis information may be transmitted to the mobile device through a speaker 50 in the form of the audio signal.

Figure 2:
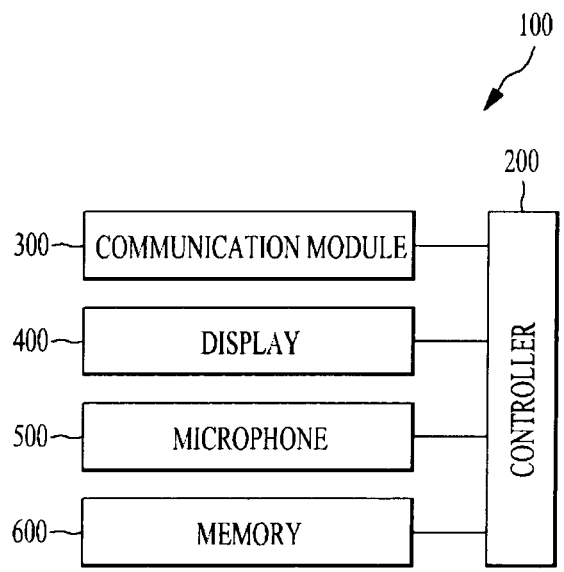
FIG. 2 is a schematic block diagram of a mobile terminal that is applicable to an embodiment of the present invention.

Hereinafter, the mobile device 100 that is applicable to the present embodiment will be described with reference to FIG. 2.

The mobile device 100 may have a communication function and, for example, may be a general cellular phone or smart phone, or a mobile device specifically designed for servicing home appliances.

The mobile device 100 may include a controller 200 for controlling an operation thereof. In addition, the mobile device 100 may include a communication module 300 for communication with external objects. The communication module 300 may be used for audio communication or data communication and may include a plurality of communication modules in order to provide various communication methods. Of course, the communication module 300 may include a communication module for communication with the communication module 30 of the home appliance 10. When the home appliance 10 includes the Wi-Fi communication module, it is preferable that the mobile device 100 also include a Wi-Fi communication module.

Preferably, the mobile device 100 includes a display 400. The display 400 may display various information and may include a user interface. For example, when the display 400 is a touch display, various inputs may be input through the display 400.

The mobile device 100 may include a memory 600 for recording various application programs. Of course, the memory 600 may be used to construct a database.

If necessary, the controller 200 may execute the application program to perform necessary functions and may use the various information stored in the memory 600.

Preferably, the mobile device 100 includes a microphone 500 corresponding to the speaker 50 of the home appliance 10. The microphone 500 may be a component for receiving an external audio signal and may receive an audio signal output from the speaker 50. That is, the microphone 500 may receive the diagnosis information of the home appliance 10 in the form of the audio signal.

Hereinafter, a method of controlling a mobile device will be described in detail with regard to an embodiment of the present invention with reference to FIG. 3.

First, a user may execute an application program for diagnosis of a home appliance through a mobile device (S10). The application program may be installed in the mobile device or may be downloaded from an external source through the mobile device and installed by the user.

When the mobile device is a smart phone, the user may easily install an application for diagnosis of the home appliance in the smart phone.

The application may perform various functions. One of the various functions may be a function of diagnosing the home appliance. Thus, after the execution of the application, the user may select various functions. Of course, the application may be designed only to diagnose the home appliance. Thus, in all cases, the control method of the mobile device preferably includes a menu display step (S10) of displaying a diagnosis menu for the diagnosis of the home appliance.

The menu display step (S10) may be a display step for selection of the application for the diagnosis or may be a display step for selection of a diagnosis mode for the diagnosis after the selection of the application.

Figure 4:
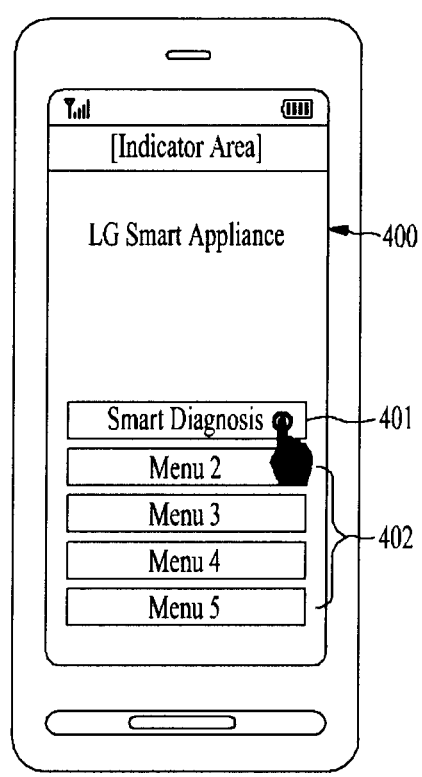
FIG. 4 is a diagram showing an example of a display of a mobile terminal on which a diagnosis menu for diagnosis of a home appliance is displayed.

An example of the menu display step (S10) is shown in FIG. 4. That is, an image displayed on a display of the mobile device is shown.

The shown image may be a main image of the mobile device or may be an image that is displayed after an application execution command is input. The user may select a smart diagnosis menu 401 for the diagnosis of the home appliance from among various menus 401 and 402.

Figure 5:
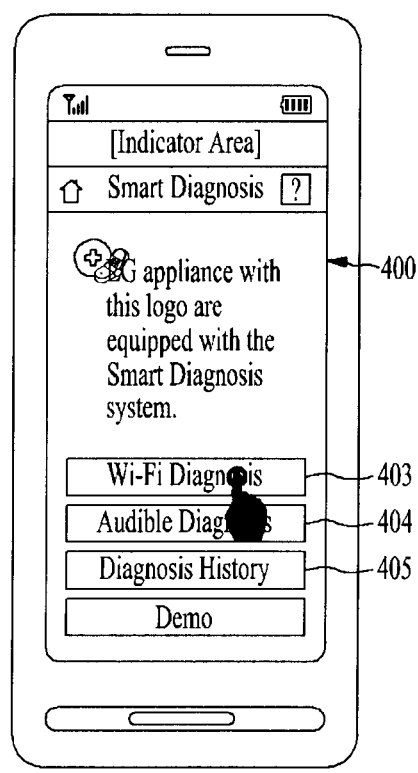
FIG. 5 is a diagram showing an example of a display on which a diagnosis mode is displayed.

When the smart diagnosis menu 401 is selected, a mode display step (S20) of displaying a diagnosis mode may be performed. An example of the mode display step (S20) is shown in FIG. 5.

The diagnosis mode may be related to whether information is received in the form of an audio signal or a digital signal. Here, the information is about a current state of the home appliance or the presence of the problem of the home appliance and is diagnosed by the home appliance. The former mode may be referred to as an audible diagnosis mode and the latter mode may be referred to as a wireless diagnosis mode. Thus, in the mode display step (S20), at least an audio diagnosis mode menu 404 and a wireless diagnosis menu 403 are preferably displayed. FIG. 5 shows a menu for selection of a Wi-Fi diagnosis mode as an example of the wireless diagnosis mode.

In the mode display step (S20), a diagnosis history menu 405 may be displayed. When the diagnosis history menu 405 is selected, a diagnosis history may be displayed as described later.

Of course, the menu display step (S10) may be replaced by the mode display step (S20). This is because, in the case of the application for the diagnosis only, the diagnosis mode may be displayed just after the execution of the application.

Hereinafter, the control method of a case in which an audio diagnosis mode is selected in the mode display step (S20) will be described in detail.

When the smart diagnosis menu 401 or the audio diagnosis mode menu 404 is selected, the mobile device 100 may perform an information receiving step (S23) of receiving the diagnosis information through the microphone 500. In other words, the mobile device 100 may receive the diagnosis information obtained by diagnosing the home appliance 10 to be diagnosed, which is performed by the home appliance 10.

Here, the diagnosis information needs to be generated by the home appliance 10 and to be transmitted to the mobile device 100. Thus, the home appliance 10 needs to generate the diagnosis information and then the generated diagnosis information needs to be transmitted to the mobile device 100.

As described above, an input step (S21) may be performed through the diagnosis button 40 in order to command the home appliance 10 to generate the diagnosis information. After the input for the generation of the diagnosis information, the home appliance 10 generates the diagnosis information and generates an audio signal through the speaker 50 (S22). Accordingly, Steps S21 and S22 may not be performed by the mobile device.

When the audio signal is generated from the home appliance 10, the user needs to manipulate the mobile device to receive the audio signal. That is, the user needs to manipulate the mobile device to perform the information receiving step (S23).

Figure 6:
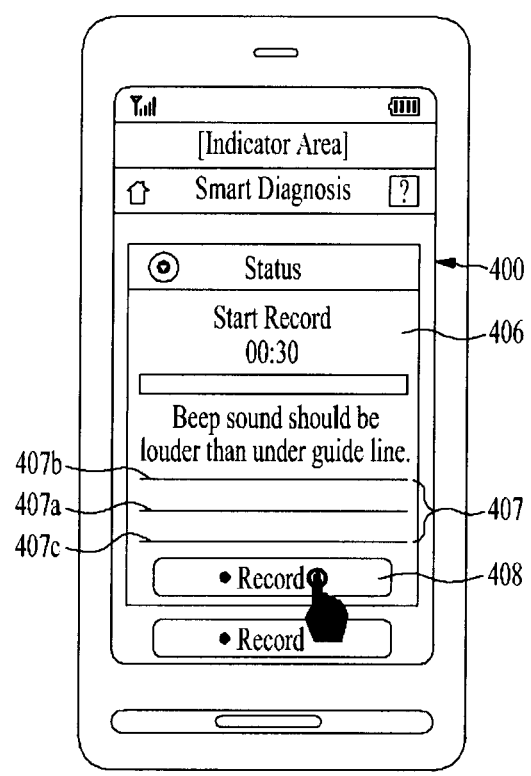
FIG. 6 is a diagram showing an example of a display on which an execution mode for receipt of information and an information receiving state are displayed.
Figure 7:
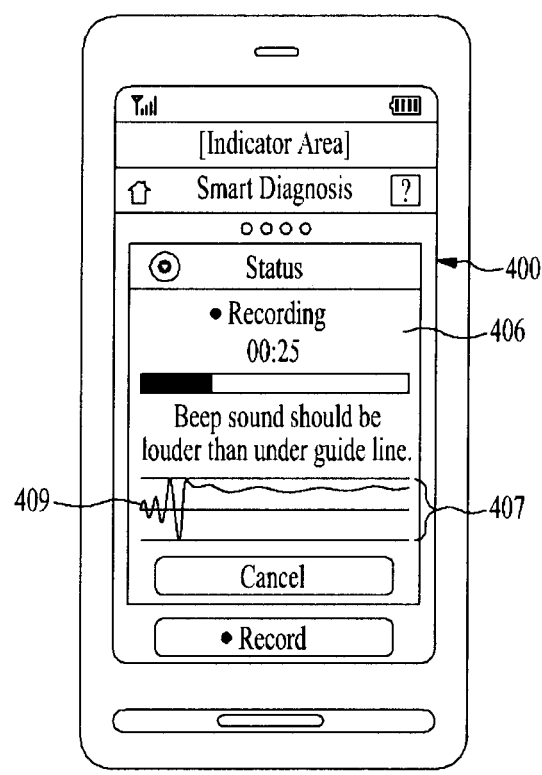
FIG. 7 is a diagram showing an example of a display on which an information receiving progress state is displayed.

To this end, the information receiving step (S23) may include a step of displaying an execution menu 408 for performance of the information receiving step (S23). That is, the execution menu 408 may be displayed such that the user may command the mobile device to receive the audio signal. FIG. 6 shows an execution menu display step.

The execution menu 408 may be a record menu. In this case, when the user pushes the execution menu 408, the mobile device receives and records the audio signal that is transmitted through the microphone 500 from the speaker 50 of the home appliance 10.

As shown in FIG. 6, the execution menu display step may include a step of displaying progresses or a progress state of the information receiving step (S23). In other words, when a recording session or the progress state is displayed, the execution menu 408 for selection of the user may be simultaneously displayed. The recording session or the progress state may be displayed on a separate display region 406 different from the execution menu 408. That is, the separate display region 406 and the execution menu 408 may be distinguished from each other.

When audio information is received, intensity of an audio signal is very important. This is because it may be difficult to recognize or determine an audio signal having too small intensity. That is, it may be difficult to determine whether the audio information is the same as comparison information that is subject to comparison. Of course, the reliability of a recorded audio signal may vary according to the performance of the speaker 50 or the microphone 500 and may also vary according to a distance between the speaker 50 and the microphone 500.

Thus, in order to increase the reliability and accuracy of a recording operation, a guide display step may be performed so as to inform the user of whether an intensity of an audio signal received by the mobile device 100 is within an appropriate band.

The information receiving step (S23) may include the guide display step. The guide display step is shown in FIG. 6.

In detail, FIG. 6 shows an example in which the execution menu display step, the step of displaying progresses and a progress state of the information receiving step (S23), and the guide display step are simultaneously performed. Preferably, a guide image 407 is displayed on a separate region from a region of the progress state or the execution menu 408.

According to the guidance in the guide display step, the intensity of the recorded audio signal may be equal to or greater than a minimum allowable intensity. In other words, the guide display step may allow the user to visibly recognize whether the intensity of the audio signal is within an appropriate band. To this end, in the guide display step, an amplitude of a received audio signal is preferably visibly displayed.

In the guide display step, a guide line as a reference of the appropriate band is preferably displayed. The guide line may include a reference line 407a and bandwidth lines 407b and 407c that respectively are displayed above and below the reference line 407a. A minimum allowable amplitude may be indicated using the bandwidth lines 407b and 407c.

When a displayed audio signal 409 is within a bandwidth indicated by the bandwidth lines 407b and 407c, the intensity of the recorded audio signal is relatively small. Thus, ideally, the user brings the microphone 500 of the mobile device 100 closer to the speaker 50 of the home appliance 10.

During the information receiving step (S23), the progress state may be displayed via variation of the recording session or color change of a bar.

Figure 8:
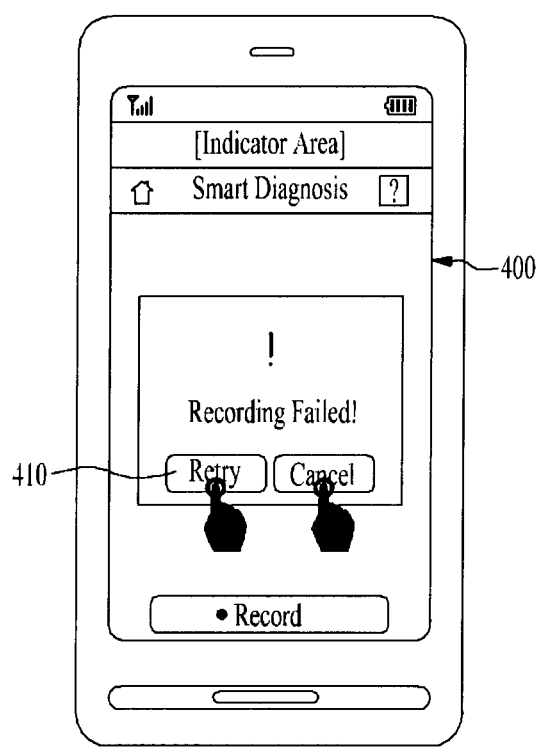
FIG. 8 is a diagram showing an example of a display on which information reception failure and a retry menu are displayed.

When the information receiving step (S23) is completely performed, a step of determining whether the information receiving step (S23) is successful may be performed (S24). That is, whether the intensity of the recorded audio signal is within an analyzable band. When the intensity of the recorded audio signal exceeds the analyzable band, for example, when the intensity of the audio signal is small, failure of the information receiving step (S23) may be displayed and a rerecord execution menu may be displayed (S25). FIG. 8 shows an example of an image in which the recording failure is displayed and a menu 410 for receiving information about whether rerecord is displayed.

When it is determined that the information receiving step (S23) is successful (S24), a step of extracting diagnosis results may be performed (S40). That is, received information and reference information are compared to extract the diagnosis results.

The reference information may correspond to an audio signal for a normal state and audio signals for various abnormal states. Of course, the reference information may correspond to digital codes for the normal state and various abnormal states. In this case, the mobile device 100 may extract digital codes from the audio signal and then may compare the digital codes with a reference digital code.

Here, the reference information may be stored in the memory 600 of the mobile device 100 or may be searched for through an external database (DB). For example, the digital codes (for example, error codes) extracted from the mobile device 100 may be compared with an error code stored in an internal or external DB to extract the diagnosis results respectively corresponding to the error codes.

When the diagnosis results are extracted, steps (S41 and S42) of displaying the diagnosis results of the home appliance 10 on the display 400 of the mobile device 100 may be performed.

In other words, the result display steps (S41 and S42) of displaying the diagnosis results of the home appliance 10 based on information received from the home appliance 10 may be performed.

The diagnosis results may correspond to information indicating that a problem does not occur or is not detected. In addition, the diagnosis results may correspond to information indicating that the problem is caused by component error. Of course, a plurality of problems may be diagnosed.

When the diagnosis results are displayed, solution display steps (S41 and S42) of displaying a solution based on the diagnosis results are preferably performed. That is, preferably, measures to be taken by the user may be suggested to the user.

This is because, in many cases, home appliance diagnosis is performed when the user determines that the home appliance is operating abnormally or cannot use the home appliance. In other words, in many cases, home appliance diagnosis is performed in order for the user to quickly address the problem of the home appliance.

As the diagnosis result, when a normal state of the home appliance or no problem is displayed, the user may still determine that the home appliance is abnormal. In addition, an unpredicted problem may still continue. Thus, in this case, a contact number of a service center is preferably displayed.

Figure 9:
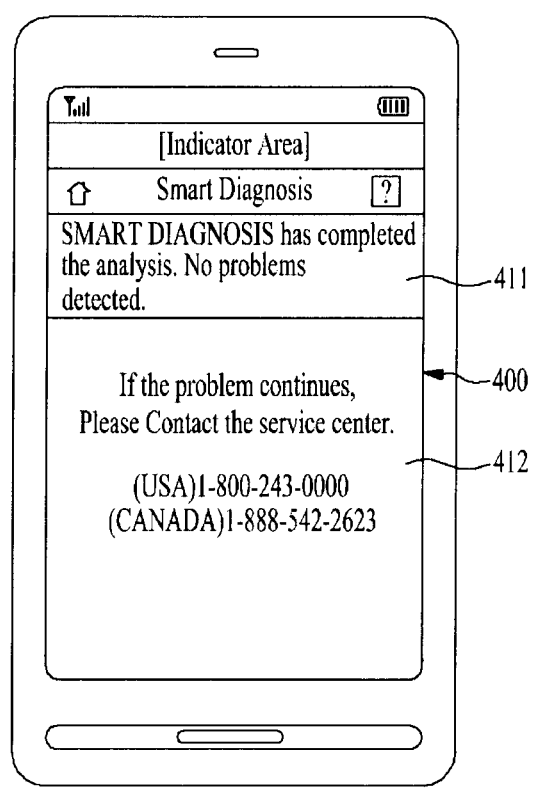
FIG. 9 is a diagram showing an example of a display on which a diagnosis result corresponding to a normal state is displayed.

FIG. 9 shows an example in which information 411 indicating that no problems are detected and a contact number 412 of the service center are simultaneously displayed. That is, the diagnosis results and solution information are preferably simultaneously displayed on different regions of the display 400.

One problem or a plurality of problems may be detected. In addition, the user may or may not be able to address the problems.

In the case of the washing machine, for example, when water supply is not performed, the diagnosis result may be displayed as a water supply problem. In this case, the user may check whether a faucet is turned off. Checking the faucet is a measure to be taken by the user. However, when a problem occurs in a water supply valve, the user cannot address the problem. Thus, even if the same problem occurs, the user may or may not be able to address the problem.

Thus, in the solution display steps (S41 and S42), information about the contact number of the service center is preferably displayed regardless of the extracted diagnosis results (S41).

Figure 11:
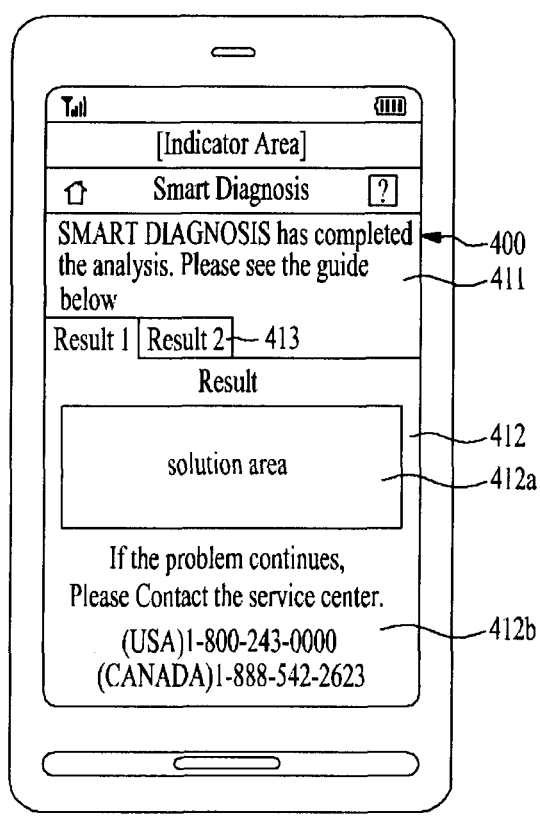
FIG. 11 is a diagram showing an example of a display on which a diagnosis result corresponding to two problems is displayed.
Figure 12:
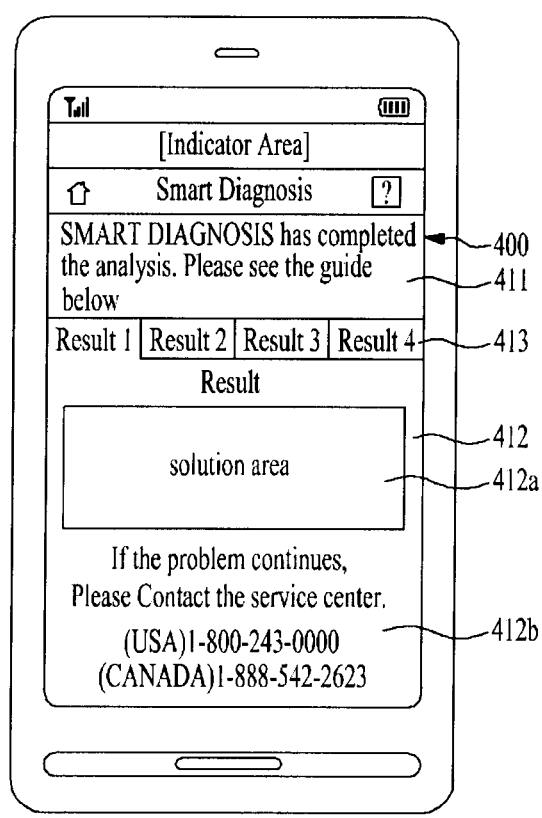
FIG. 12 is a diagram showing an example of a display on which a diagnosis result corresponding to four problems is displayed.

When the user can take measures according to the problem, the measures to be taken by the user are preferably displayed (S42). FIGS. 11 and 12 show examples in which diagnosis results corresponding to two or more problems are displayed and measures with respect to the problems and the information of the contact number of the service center are displayed.

The user may easily take measures with respect to a diagnosis result corresponding to a certain problem. In addition, although the user takes measures, when the problem continues, the user may contact the service center.

Figure 10:
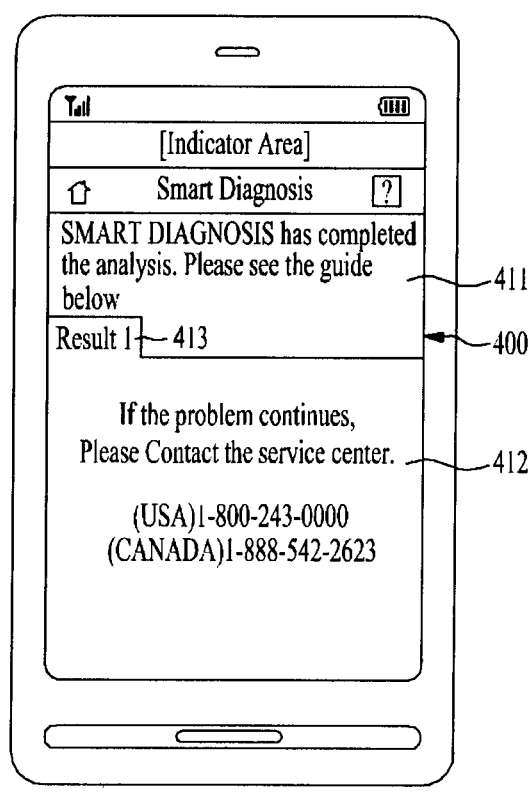
FIG. 10 is a diagram showing an example of a display on which a diagnosis result corresponding to a problem which a user cannot address is displayed.

Similarly, as shown in FIG. 10, when a problem that cannot be addressed by the user is displayed, the user may directly contact the service center.

As shown in FIGS. 11 and 12, when a plurality of problems is detected, menus 413 for selection of the various problems are preferably displayed. In addition, when a menu for a certain problem is selected, resolving method images, that is, solution images 412, 412a, and 412b corresponding to the selected menu are preferably displayed.

In other words, the solution image 412 may include a user measure image 412a and a service center number 412b. The user measure image 412a and the service center number 412b may be displayed on different regions.

Only sequences of error results are indicated on the menus 413 shown in FIGS. 11 and 12. However, the error results may be indicated by error codes. When a certain error code is selected, the solution image 412 may include an error type and user measures. Of course, when the user cannot take measures, the error type and the user measures may not be displayed.

The error code contains error information and thus the user may easily transmit a problem to the service center based on the error code. That is, when the error code is transmitted to the service center, the problem may be easily transmitted to the service center without detailed explanation of the problem.

Thus far, the audible diagnosis mode has been described. Hereinafter, the wireless diagnosis mode will be described.

Figure 3:
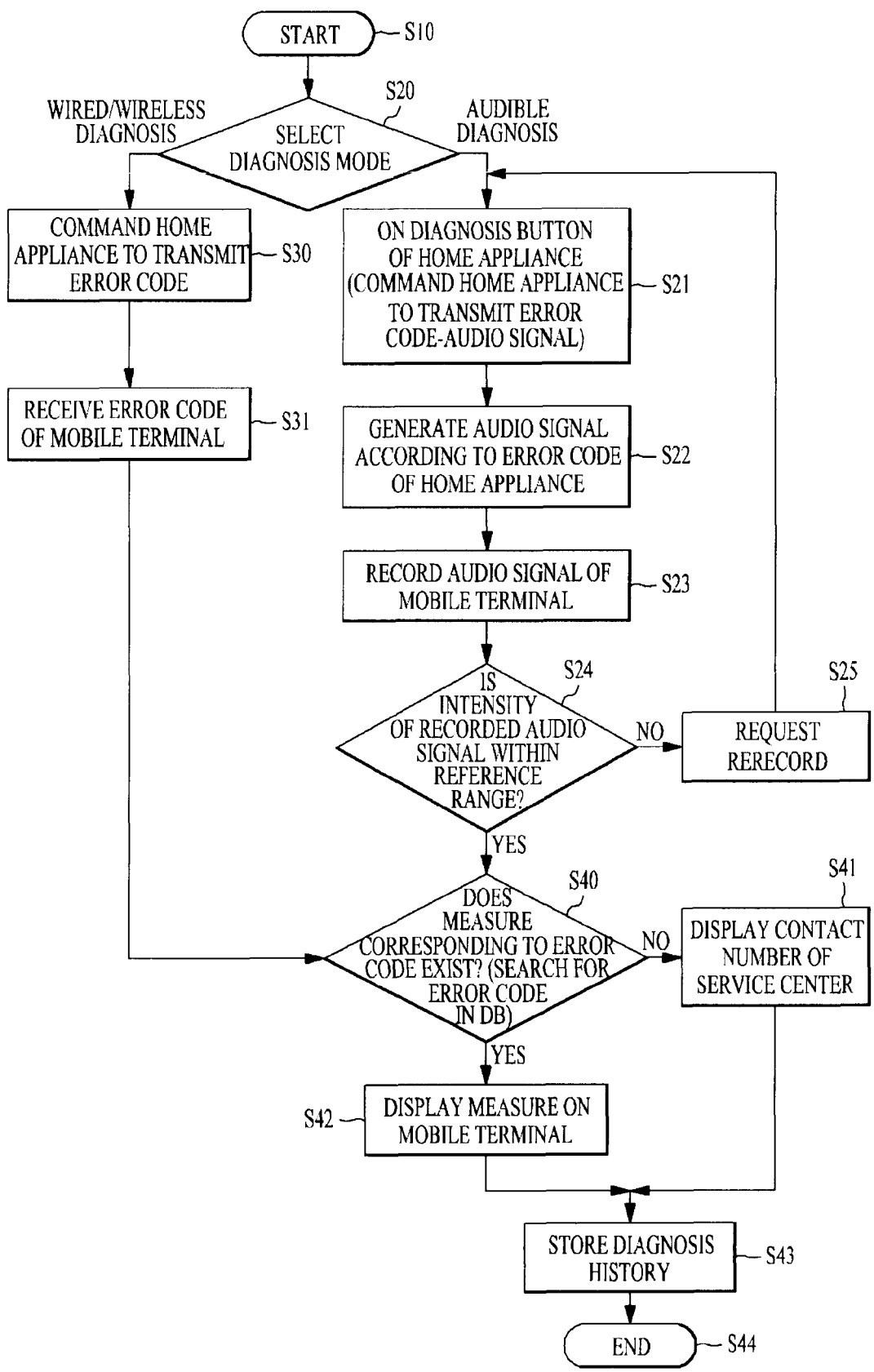
FIG. 3 is a flowchart of a method of controlling a mobile terminal according to an embodiment of the present invention.

As shown in FIG. 3, when the wireless diagnosis mode is selected in a mode selection step (S20), the mobile device 100 may command the home appliance 10 to transmit the diagnosis information to the mobile device 100 (S30). When the home appliance 10 receives the command, the home appliance 10 generates the diagnosis information and transmits the diagnosis information to the mobile device 100. In addition, the mobile device 100 receives the diagnosis information from the home appliance 10 (S31).

Figure 13:
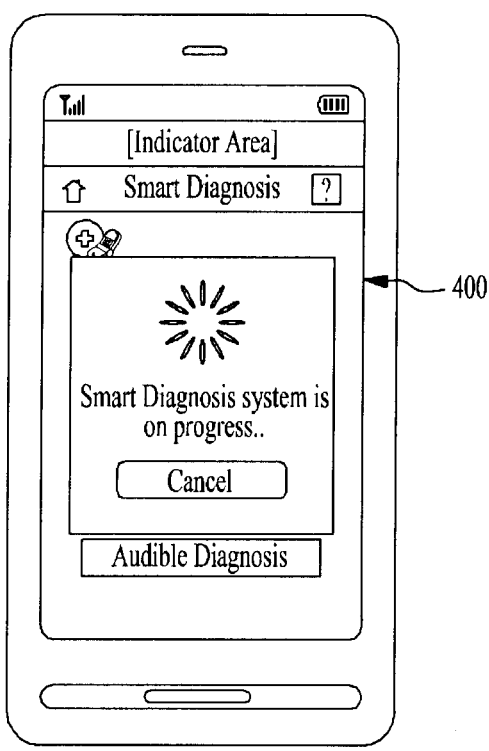
FIG. 13 is a diagram showing an example of a display on which an execution state of a wireless diagnosis mode is displayed.

That is, when the wireless diagnosis menu 403 shown in FIG. 5 is input, an image of the display 400 of the mobile device 100 may be converted as shown in FIG. 13. That is, the receiving step (S31) corresponding to the information receiving step (S23) may be performed through the image shown in FIG. 13.

The wireless diagnosis mode may be performed by communication modules of the mobile device 100 and the home appliance 10 or may be performed by transmitting digital signals. The digital signal may include a digital code or an error code. The mobile device 100 may compare the received digital signals with reference information (S40).

Figure 14:
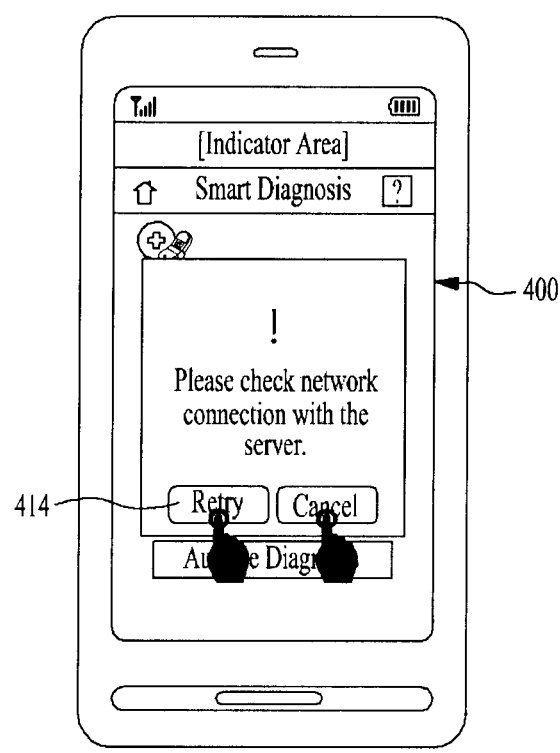
FIG. 14 is a diagram showing an example of a display on which failure of a wireless diagnosis mode and a retry menu are displayed.

When the receiving step (S31) is successfully completed, the result display step and the solution display step may be performed as in the above-described audio diagnosis mode. When the receiving step (S31) is not successfully completed, an image shown in FIG. 14 may be displayed. As shown in FIG. 14, failure of the wireless diagnosis mode may be caused by a communication problem. Thus, a retry menu together with a message indicating that a network connection needs to be checked may be displayed (S414).

When the result display step and the solution display step are completed, a diagnosis history may be stored in the memory 600 of the mobile device 100. The diagnosis history may include a diagnosis date and a diagnosis result and may further include a diagnosis mode.

The diagnosis history may be checked via the diagnosis history menu 405 shown in FIG. 5.

The wireless diagnosis mode may be simply, easily, and correctly performed via communication and calculation. This is because the wireless diagnosis mode may be easily performed using a user input only. On the other hand, the audio diagnosis mode requires manipulation of a home appliance (for example, a diagnosis button input) and manipulation of mobile devices (for example, approach of a mobile terminal to the home appliance). However, it is not necessary to install a communication module in the home appliance, and thus, the home appliance may be diagnosed at relatively low cost.

As is apparent from the above description, the present invention provides a method of controlling a mobile terminal, for easily diagnosing a home appliance through the mobile terminal. In addition, the present invention provides a mobile terminal for diagnosis of the home appliance.

According to an embodiment of the present invention, a mobile terminal and a method of controlling the same may easily diagnose the home appliance even if a communication module is not installed in the home appliance.

According to an embodiment of the present invention, a mobile terminal and a method of controlling the same may diagnose a home appliance using an audio signal and may provide a diagnostic method ensuring reliability and accuracy of the audio signal.

According to an embodiment of the present invention, a mobile terminal and a method of controlling the same may provide different solutions when a user can or cannot address a problem of a home appliance to provide a convenient diagnosis method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
   a menu display step of displaying a diagnosis menu for diagnosis of a home appliance on a display;
   an information receiving step of receiving information about a current state of the home appliance or presence of a problem as an audio signal when the diagnosis menu is selected, the information being diagnosed by the home appliance;
   a result display step of displaying a diagnosis result of the home appliance on the display, the diagnosis result being obtained based on the information received in the information receiving step; and
   a solution display step of displaying a solution based on the diagnosis result to suggest a measure to be taken by a user to the user, wherein the information receiving step comprises a guide display step of informing the user of whether an intensity of the audio signal is within an appropriate band to a user.

2. The method according to claim 1, wherein the information receiving step comprises an execution menu display step of displaying an execution menu for performance of the information receiving step.

3. The method according to claim 2, wherein the information receiving step comprises a step of displaying progresses and progress states of the information receiving step when the execution menu is selected.

4. The method according to claim 1, wherein the guide display step comprises displaying a guide line as a reference of the appropriate band and visibly displaying an amplitude of the audio signal on the guide line.

5. The method according to claim 4, wherein the guide line comprises a reference line and bandwidth lines respectively displayed above and below the reference line and indicating a minimum allowable amplitude.

6. The method according to claim 1, wherein the menu display step further comprises a mode selection step of selecting an information receiving mode.

7. The method according to claim 6, wherein the information receiving mode comprises a wireless diagnosis mode in which the information is received as a digital signal from the home appliance through a wireless fidelity (Wi-Fi) communication module, and an audio diagnosis mode in which the information is received as an audio signal through a microphone.

8. The method according to claim 7, wherein the information receiving step comprises receiving information about a current state of the home appliance or presence of a problem, as a digital signal, when the wireless diagnosis mode is selected, the information being diagnosed by the home appliance.

9. A method of controlling a mobile terminal, the method comprising:

a menu display step of displaying a diagnosis menu for diagnosis of a home appliance on a display;

an information receiving step of receiving information about a current state of the home appliance or presence of a problem as an audio signal when the diagnosis menu is selected, the information being diagnosed by the home appliance;

a result display step of displaying a diagnosis result of the home appliance on the display, the diagnosis result being obtained based on the information received in the information receiving step; and a solution display step of displaying a solution based on the diagnosis result to suggest a measure to be taken by a user to the user, wherein the information receiving step comprises an execution menu display step of displaying an execution menu for performance of the information receiving step, wherein the result display step is performed when the information receive step is successfully performed, and wherein a retry menu for retrying the information receiving step is displayed when the result display step fails.

10. A method of controlling a mobile terminal, the method comprising:

a menu display step of displaying a diagnosis menu for diagnosis of a home appliance on a display;

an information receiving step of receiving information about a current state of the home appliance or presence of a problem as an audio signal when the diagnosis menu is selected, the information being diagnosed by the home appliance;

a result display step of displaying a diagnosis result of the home appliance on the display, the diagnosis result being obtained based on the information received in the information receiving step; and a solution display step of displaying a solution based on the diagnosis result to suggest a measure to be taken by a user to the user, wherein the information receiving step comprises an execution menu display step of displaying an execution menu for performance of the information receiving step, wherein the information received in the information receiving step is compared with reference information in a database (DB) of the mobile terminal or an external DB to extract the diagnosis result, and the diagnosis result is displayed in the result display step.

11. The method according to claim 10, wherein the result display step and the solution display step are performed on different display regions of the same display.

12. The method according to claim 11, wherein the solution display step comprises displaying a contact number of a service center regardless of the diagnosis result.

13. The method according to claim 11, wherein the solution display step comprises separately displaying a problem to be addressed by the user and a problem not to be addressed by the user when the home appliance has problems as the diagnosis result.

14. The method according to claim 11, further comprising:

displaying a menu for selecting a problem from among a plurality of problems of the home appliance as the diagnosis result; and displaying a solution corresponding to a menu corresponding to the selected problem when the menu is selected.

15. The method according to claim 14, further comprising:

simultaneously displaying a measure to be taken by the user and a contact number of a service center when the problem is to be addressed by the user; and displaying the contact number of the service center when the problem is not to be addressed by the user.

16. A method of controlling a mobile terminal, the method comprising:

a mode display step of displaying a diagnosis mode on a display so as to allow a user to select whether information about a current state of the home appliance or presence of a problem is received as an audio signal or a digital signal, the information being diagnosed by the home appliance;

an information receiving step of receiving the information as the audio signal or the digital signal according to a diagnosis mode when the diagnosis mode is selected;

a result display step of displaying a diagnosis result of the home appliance based on the information received in the information receiving step, on the display; and a solution display step of displaying a solution based on the diagnosis result to suggest a measure to be taken by a user to the user.

17. The method according to claim 16, wherein the diagnosis mode comprises a wireless diagnosis mode in which the information is received as a digital signal from the home appliance through a wireless communication module, and an audio diagnosis mode in which the information is received as an audio signal through a microphone.

18. The method according to claim 16, further comprising the mobile terminal commanding the home appliance to transmit the digital signal to the mobile terminal when the wireless diagnosis mode is selected.

19. The method according to claim 16, wherein a diagnosis history is stored in a memory of the mobile terminal when the result display step and the solution display step are completed.

20. The method according to claim 19, wherein a diagnosis history menu is displayed in the mode display step and the diagnosis history is displayed when the diagnosis history menu is selected.

* * * * *